United States Patent
Schwägerl et al.

(10) Patent No.: US 10,207,336 B2
(45) Date of Patent: Feb. 19, 2019

(54) ROTARY TOOL, PARTICULARLY A DRILL, AND A CUTTING HEAD FOR SUCH A ROTARY TOOL

(71) Applicant: Kennametal Inc., Latrobe, PA (US)

(72) Inventors: Jürgen Schwägerl, Vohenstrauss (DE); Berthold Heinrich Zeug, Fürth (DE); Horst Manfred Jäger, Nürnberg (DE)

(73) Assignee: KENNAMETAL INC., Latrobe, PA (US)

( * ) Notice: Subject to any disclaimer, the term of this patent is extended or adjusted under 35 U.S.C. 154(b) by 7 days.

(21) Appl. No.: 15/331,615

(22) Filed: Oct. 21, 2016

(65) Prior Publication Data

US 2017/0113281 A1 Apr. 27, 2017

(30) Foreign Application Priority Data

Oct. 23, 2015 (DE) .................. 10 2015 220 791

(51) Int. Cl.
*B23B 51/02* (2006.01)

(52) U.S. Cl.
CPC .......... *B23B 51/02* (2013.01); *B23B 2240/04* (2013.01); *B23B 2251/02* (2013.01); *Y10T 408/9097* (2015.01); *Y10T 408/9098* (2015.01); *Y10T 408/90993* (2015.01)

(58) Field of Classification Search
CPC . B23B 51/02; B23B 2251/02; B23B 2251/50; B23B 2240/04; Y10T 408/9098; Y10T 408/90993; Y10T 408/9097; Y10T 408/907

See application file for complete search history.

(56) References Cited

U.S. PATENT DOCUMENTS

| | | | | |
|---|---|---|---|---|
| 5,947,660 A | * | 9/1999 | Karlsson | ................. B23B 31/00 408/230 |
| 6,582,164 B1 | * | 6/2003 | McCormick | .......... B23B 31/113 408/144 |
| 7,407,350 B2 | * | 8/2008 | Hecht | ..................... B23B 51/02 407/34 |

(Continued)

FOREIGN PATENT DOCUMENTS

| | | |
|---|---|---|
| DE | 102012212146 A1 | 1/2014 |
| WO | WO2008072840 A2 | 6/2008 |
| WO | WO 2013150517 A1 * 10/2013 | ............. B23B 51/02 |

OTHER PUBLICATIONS

Sep. 11, 2016 First office action P15-06058-DE-NP.

*Primary Examiner* — Daniel Howell
*Assistant Examiner* — Chwen-Wei Su
(74) *Attorney, Agent, or Firm* — Ian K. Samways

(57) ABSTRACT

A rotary tool comprising two coupling parts, namely a carrier and a cutting head in a front end surface. The carrier comprises a pin receptacle into which a coupling pin of the cutting head is inserted. In order to prevent pulling-out in an axial direction, stop surfaces are provided on the pin receptacle and on the coupling pin, said stop surfaces being effective in an axial direction. For a design that is as simple as possible, in particular with regard to grinding, each stop surface of the coupling pin is adjoined by a lateral surface which freely tapers off in the direction toward the end surface as viewed in the axial direction. In particular, the lateral surface constitutes a torque surface.

24 Claims, 4 Drawing Sheets

(56) References Cited

U.S. PATENT DOCUMENTS

| | | | | |
|---|---|---|---|---|
| 8,449,227 | B2* | 5/2013 | Danielsson | B23B 51/02 408/226 |
| 8,721,235 | B2* | 5/2014 | Kretzschmann | B23B 51/02 408/144 |
| 8,864,425 | B2* | 10/2014 | Osawa | B23B 51/02 408/144 |
| 9,028,180 | B2* | 5/2015 | Hecht | B23B 51/02 408/230 |
| 9,468,979 | B2* | 10/2016 | Hecht | B23B 51/00 |
| 2009/0116920 | A1* | 5/2009 | Bae | B23B 51/02 408/227 |
| 2013/0266389 | A1* | 10/2013 | Hecht | B23B 51/02 408/229 |
| 2014/0169892 | A1 | 6/2014 | Hecht | |

* cited by examiner

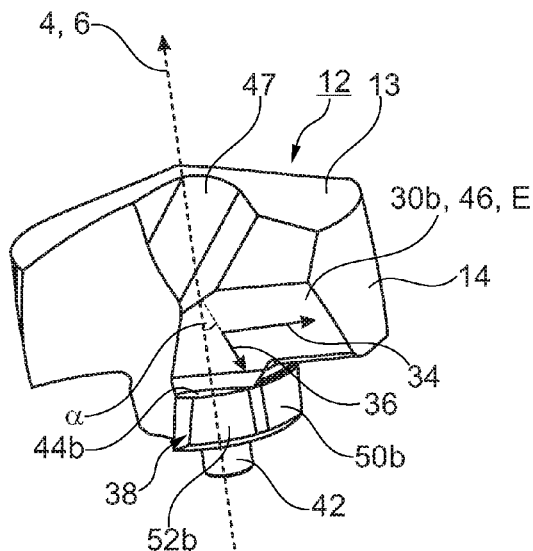
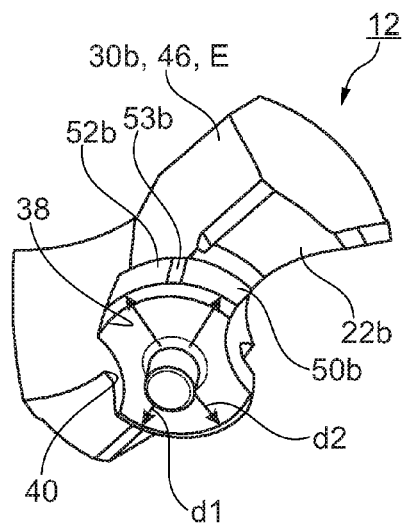
Fig. 3A
Fig. 3B
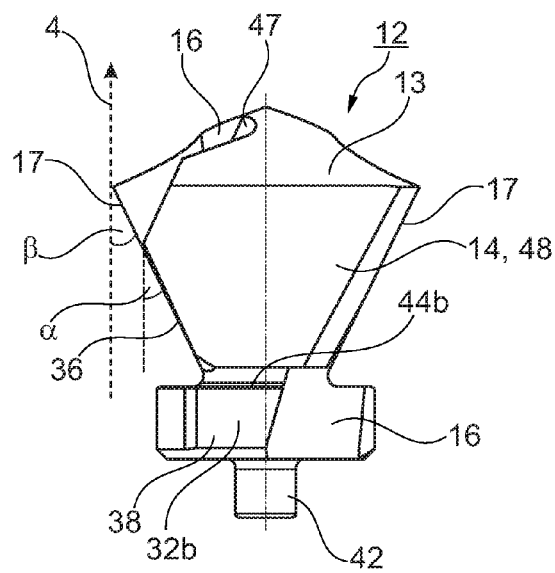
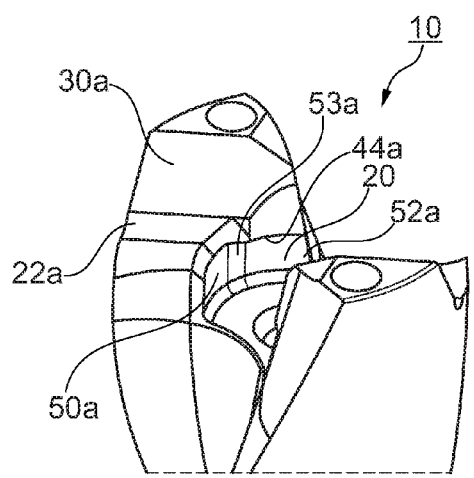
Fig. 3C
Fig. 4

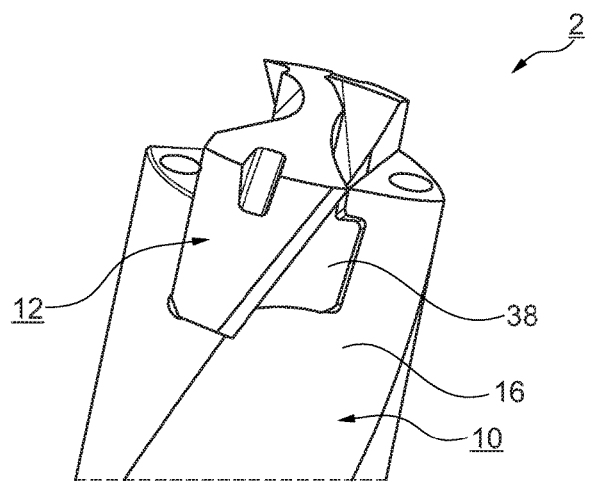
Fig. 5A
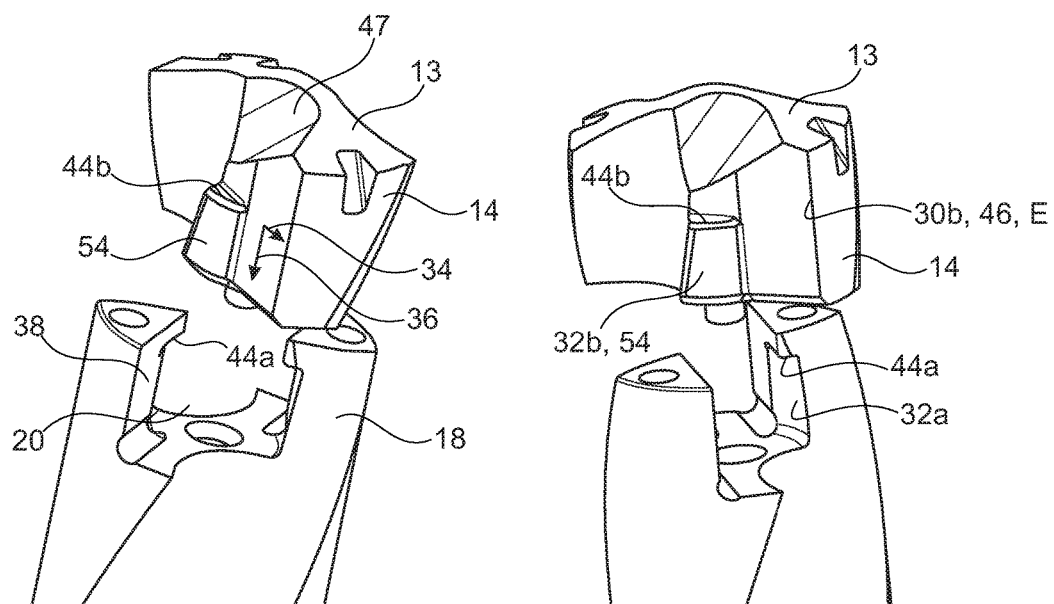
Fig. 5B                    Fig. 5C

ROTARY TOOL, PARTICULARLY A DRILL, AND A CUTTING HEAD FOR SUCH A ROTARY TOOL

CROSS-REFERENCE TO RELATED APPLICATION

This patent application claims priority under 35 U.S.C. § 119(a) to German Patent Application Number DE1020152207919, filed on Oct. 23, 2015, which is incorporated herein by reference in its entirety.

BACKGROUND

The invention relates to a rotary tool, particularly to a drill, with the features of the preamble of claim 1, and to a cutting head for such a rotary tool.

A rotary tool of this type is known for example from WO 2008/072840 A2 or from the applications PCT/EP2015/056288 or DE 10 2015 211744.8 by the applicant, which were not published at the time of the application.

The rotary tool is what is known as a modular rotary tool which extends in an axial direction along an axis of rotation and comprises two coupling parts, namely a carrier and a cutting head. The cutting head is interchangeably attached to the carrier. For this purpose, the carrier generally comprises on its end surface two opposing fastening webs which are separated from each other by flutes and by means of which the pin receptacle is delimited. A coupling pin of the cutting head is inserted into this pin receptacle. This is carried out by rotating the cutting head around the axis of rotation relative to the carrier. During this rotation, a clamping connection between the cutting head and the carrier is typically formed so that the two coupling parts are held together in a clamping manner. In particular, no additional fastening media such as screws or the like are arranged therein. The clamping attachment takes place between the outer shell surfaces of the coupling pin and the inner shell surfaces of the pin receptacle.

Furthermore, surfaces corresponding to one another are formed for transmitting a torque from the carrier to the cutting head. These torque transfer surfaces are hereinafter referred to in short as torque surfaces.

Modular rotary tools can be differentiated into two different types. In a first type, which can be gleaned for example from WO 2008/072840 A2, the torque surfaces extend radially outward up to an outermost circumference of the cutting head, which is also referred to as a drill rear portion. According to a second variant, for example as is described in the two aforementioned unpublished applications, the torque surfaces are directly formed on the coupling pin as shell surfaces thereof which interact with corresponding inner shell surfaces of the fastening webs.

Both the torque surfaces and the clamping surfaces of the cutting head and the carrier are opposite one another in pairs in the coupled state, i.e. when the cutting head is inserted into the carrier. The clamping surfaces corresponding to one another then respectively produce a press fit.

In the aforementioned applications, in order to prevent a pulling-out in the axial direction, stop surfaces that extend approximately horizontally and that interact with the corresponding stop surfaces of the carrier are respectively formed on the coupling pin in order to thus ensure a positive locking (or securing) in the axial direction for the cutting head. This positive locking (or securing) prevents the cutting head from being pulled out of the carrier in the axial direction—for example, when pulling the rotary tool out of the drill hole after a drilling process.

In WO 2008/072840 A2, a circumferential groove in the manner of a piercing (or incision) is formed on the coupling pin in order to produce this axial pull-out protection. In a similar manner, in the two aforementioned applications unpublished at the time of the application the stop surfaces are also formed by being radially ground in in the manner of piercings (or incisions). This is associated with a certain effort, owing to the complex geometries of the cutting heads.

SUMMARY

Proceeding from the above, the invention is based on an objective of providing such a modular rotary tool, wherein axial pull-out protection is realized that is manufactured as easily as possible.

The objective is achieved according to the present invention by way of a rotary tool with the features of claim 1 and by way of a cutting head with the features of claim 18. Advantageous developments are specified in the dependent claims. The advantages and preferred embodiments mentioned with regard to the rotary tool are also to be applied analogously to the cutting head.

The rotary tool extends in the axial direction along an axis of rotation and comprises a carrier and a cutting head with a front end surface. The cutting head is attached to the carrier as described in the preamble above so as to be interchangeable via being rotated. On the end surface, the cutting head comprises major cutting edges extending outward from a center. These major cutting edges are adjoined by free spaces that typically taper off into flutes which are associated with a respectively following major cutting edge. On the cutting head itself, flutes are typically already introduced that are continued in the carrier in their further course. Generally, the flutes are helical. On its end surface, the carrier generally comprises two opposing fastening webs at the end surface by way of a pin receptacle (into which a coupling pin of the cutting head is inserted) is delimited, wherein by rotating the cutting head relative to the carrier the coupling pin in particular produces a clamping with the carrier so that a press fit is produced between clamping surfaces of the coupling pin and the carrier that correspond to one another. Generally, shell surfaces corresponding to one another are formed on the coupling pin and on the fastening webs, which shell surfaces are used at least to center the coupling pin in the carrier but preferably to transmit the radial clamping force. Furthermore, torque surfaces corresponding to one another are formed on the cutting head and on the carrier to transmit a torque. With regard to an axial pull-out lock, stop surfaces effective in an axial direction are formed on the pin receptacle and on the coupling pin so that a positive locking effective in the axial direction is thus produced when the cutting head is inserted into the carrier. In order to allow for production of the cutting head with stop surfaces that is as simple as possible, each stop surface of the coupling pin is adjoined by a lateral surface that tapers off in the direction toward the end surface when viewed in the axial direction. "Tapering off toward the end surface" in this respect means that the lateral surface extends, starting from an axial inner end of the stop surface, in the direction toward the end surface without encountering a substantially right-angled overhang, as is the case with a ground-in groove, for example. "Substantially right-angled" in this respect means that the lateral surface does not encounter a surface of an overhang which runs transversely and at an angle of 90°+/−45° with respect to the axis of rotation. A surface slightly inclined with respect to the axis of rotation is possible without involving a grinding-in of the lateral surface that is being excessively complicated.

In a preferred embodiment, the lateral surface tapers off freely at its end that is frontmost in the direction toward the end surface, i.e. it is not covered by a part of the cutting head, in particular not by a part of the end surface in the manner of an overhang (when viewed in the axial direction, i.e. in a projection of the end surface in the axial direction).

Preferably, the lateral surface tapers off at the end surface, i.e. it extends up to the end surface. Alternatively, another surface that extends up to the end surface adjoins the lateral surface.

In contrast to known pull-out protection, in which the stop surfaces are formed by introducing a radial piercing or a radial ground-in groove, the lateral surface (which in particular freely tapers off toward the end surface) has the particular advantage of a simple grinding-in. Therefore, no overhangs—at least no substantially right-angled overhangs, i.e. partial regions of the cutting head that protrude toward the end surface—need to be taken into consideration.

The stop surfaces preferably form upper boundary surfaces of at least one partial region of the coupling pin, and preferably of the entire coupling pin. The coupling pin therefore ends with the stop surfaces. The coupling pin itself, with its circumferentially arranged shell surfaces, in particular forms the clamping surfaces for the clamping attachment. These clamping surfaces are expediently oriented parallel to the axial direction, thus not forming an undercut with the corresponding surfaces on the carrier.

With regard to a production that is as simple as possible, the respective lateral surface is formed by grinding, i.e. the lateral surfaces are constituted by a ground surface. The lateral surface is expediently formed as a planar ground surface. For example, the ground surface is formed by simply advancing a grinding wheel with its flat side.

The respective lateral surface at the same time expediently constitutes the torque surface or at least a portion thereof, wherein the torque surface preferably extends up to the outermost circumference of the cutting head, i.e. up to the drill rear portion.

As an alternative to this embodiment, there is also the possibility of the torque surface being independent of the lateral surface. Preferably, the lateral surface is adjoined in the radial or vertical direction by the torque surface that then extends up to the outermost circumference of the cutting head. In general, in a preferred embodiment a torque surface that extends up to the outermost circumference of the cutting head is formed.

As an alternative thereto, there is also the possibility that the torque surfaces lie on the inside, i.e. are enclosed by the fastening webs. In this case, the torque surfaces as outer shell surfaces interact with the inner shell surfaces of the fastening webs. In a preferred embodiment, the torque surfaces extend up to the outermost circumference.

Preferably, the lateral surface is generally spanned by a transverse direction which extends in the horizontal direction, orthogonal to the axial direction, and by a longitudinal direction. In a preferred embodiment, the longitudinal direction is inclined by a non-zero inclination angle with respect to the axial direction, i.e. the longitudinal direction is not parallel to the axial direction. By way of this design, a type of overhang is formed overall so that no material has to be removed at the end surface, which has a positive effect on the stability of the cutting head. At the same time, however, the advantage of the lateral surface freely tapering off toward the end surface is maintained. In this embodiment, the lateral surface therefore protrudes from the stopping surface at least in part, in a projection as viewed in the axial direction. In particular, in combination with the design of the lateral surface as a torque surface, the particular advantage of an improved force transmission during the torque transmission is achieved; as a result, it is not just radial loading that takes place. Rather, by way of the inclination, a portion of the force is also transmitted in the axial direction.

The inclination angle is expediently between 10° and 25°.

In this preferred embodiment, the inclination angle is overall expediently selected such that, in the viewing direction or projection in the axial direction, the stop surface does not protrude beyond the end surface, i.e. the end surface completely covers the stop surface.

In contrast, according to an alternative embodiment the stop surface protrudes beyond the end surface. In this alternative embodiment, the stop surface preferably protrudes with its entire extent beyond the end surface. The lateral surface, i.e. its longitudinal direction, in particular travels parallel to the axial direction.

Preferably, in this variant with the inclined lateral surface the cutting head in particular comprises a trapezoidal lateral surface—when viewed in a projection in the transverse direction—that is adjoined downward in the axial direction by the coupling pin which in the radial direction protrudes on both sides beyond the trapezoidal lateral surface.

In an expedient embodiment, the lateral surface extends in the direction of a center of the cutting head and tapers off toward a flute. As a result of the—typically curved—flute, the lateral surface therefore also tapers off freely in the radial direction at the flute so that it can also be introduced by grinding without any problems in the direction towards the flute.

An edge designed as a minor cutting edge typically runs along the flute. In a preferred embodiment, this minor cutting edge now lies behind a plane spanned by the lateral surface, namely such that this plane spanned by the lateral surface does not touch the cutting head in the region of the minor cutting edge. By this design, the grinding wheel can easily be used to grind across the entire diameter of the cutting head without the risk of the minor cutting edge being thereby affected. Overall, this design results in a particularly simple introduction of the axial pull-out lock by means of a simple one-step grinding.

In an expedient embodiment, the minor cutting edge is inclined at a flute angle, wherein the inclination angle of the lateral surface at least substantially corresponds to the flute angle. This means that the inclination angle and the flute angle are identical except for +/−5°, and preferably except for +/−3°. They are precisely identical, for example. Preferably, the inclination angle is smaller than the flute angle so that the lateral surface is thus steeper than the minor cutting edge in order to ensure that the minor cutting edge is not damaged even when grinding the lateral surface in an axially rearward region of the lateral surface that faces away from the end surface. The inclination angle of the lateral surface is generally in a range between 5° greater than and 20° smaller than the flute angle; the inclination angle is in particular approximately 5°-15° smaller than the flute angle.

In a preferred embodiment, the coupling pin is in the shape of a circular disk overall and adjoins the lower boundary surfaces of the cutting head with which the cutting head rests against associated surfaces, in particular against surfaces of the carrier that travel horizontally. As a result of the typically provided flutes, the circular disk-shaped coupling pin also comprises opposing recesses that correspond to the (partial) cross section of the flutes and are in particular approximately in the shape of a circular disk. In the preferred embodiment, with the torque surfaces extending toward the drill rear portion, the cutting head overall comprises two wings extending in the radial direction, the lower boundary surfaces of which wings are head support surfaces with which the cutting head typically comes to abut against the end surfaces of the fastening webs.

According to an alternative embodiment, the coupling pin is designed as a cylinder-like central segment of the cutting head, which central segment is adjoined in the radial direction by a respective torque surface. In this case, the head support surface is in particular flush with the lower boundary surface of the coupling pin and in particular is designed to lie in a common plane.

As already mentioned, clamping surfaces are formed on the coupling pin for the attachment via clamping. According to a first embodiment variant, the shell surfaces of the coupling pin are, for example, formed along an ellipsoidal line so that the coupling pin is thus shaped approximately like an ellipse when viewed in cross section. In this variant, an increased clamping of the coupling pin in the fastening webs is achieved during screwing-in.

In a preferred embodiment, however, it is provided that the coupling pin comprises clamping surfaces that extend along a circular arc when viewed in cross section. The clamping surfaces are in particular partially cylindrical. As a result of this design, the circumferential surface of the clamping surface therefore lies on a circular path. Instead of a line contact, a rather flat contact and thus a planar press fit is achieved.

In another preferred development, clamping segments are respectively formed on the coupling pin, which clamping segments respectively comprise several clamping surfaces so that one clamping surface pair is respectively opposite another. The diameter of successive clamping surfaces varies and increases in an intended direction of rotation of the rotary tool. The variation of the diameter is thus selected such that the diameter of the clamping surface pair increases when screwing the coupling pin into the pin receptacle. This measure results in the particular advantage that the partially cylindrical design initially achieves a best possible planar clamping effect. The respective several—in particular two to four—partially cylindrical clamping surfaces per segment also result in the particular advantage that a comparatively small rotational movement already leads to a release of the clamping effect, and thus to the release of the cutting head. Therefore, only a comparatively small turning is sufficient to generate a very high clamping force.

Generally, clamping surfaces are formed on the coupling pin to transmit the radial clamping force. These clamping surfaces are typically curved, thus extending—when viewed in cross section orthogonally to the axis of rotation—along a curved line, in particular along a circular arc. The clamping surfaces are therefore typically designed as partially cylindrical surfaces or partially conical surfaces.

According to a preferred alternative, they are designed as flat surfaces. In the circumferential direction or direction of rotation, the coupling pin therefore has several flat surface regions which are respectively designed to transmit a clamping force. The coupling pin is therefore designed with a multitude of facets. The individual facet surfaces are therefore arranged at an angle relative to each other. This achieves the advantage that a type of catch is at the same time realized by these facet surfaces, and thus a locking against undesired turning. Corresponding to the facet-like clamping surfaces on the coupling pin, there are corresponding surfaces that are also preferably formed on the pin receptacle.

This concept of the facet-like design of the clamping segments can generally be transferred to any coupling pin with clamping surfaces, and is not limited to the design described here with the specific lateral surfaces tapering off freely toward the end surface. The right to submit one or more continuing applications based on this general concept remains reserved.

The design and advantages of these embodiment variants with several partially cylindrical clamping surfaces is described in detail in the German application DE 10 2015 220 777.3 by the applicant with the title "Tool Coupling between Two Coupling Parts and Coupling Part for such a Tool Coupling," which was submitted at the same time as the present application. Reference is hereby made to the entire content of that application, and the content of its disclosure is hereby incorporated by reference into the present document.

BRIEF DESCRIPTION OF THE DRAWINGS

Exemplary embodiments of the invention are explained in greater detail on the basis of the figures. These show, partially in simplified illustrations:

FIG. 4 is a perspective illustration of the carrier according to FIGS. 1A, 1B, FIGS. 5A, 5B, 5C are various illustrations of a second embodiment of the modular rotary tool with the cutting head inserted (FIG. 5A) as well as exploded views (FIGS. 5B, 5C), and FIGS. 6A to 6C are various views of the cutting head according to the second embodiment, while

Parts that function in the same manner have the same reference numbers in the figures.

DETAILED DESCRIPTION

Figures 1A, 1B:
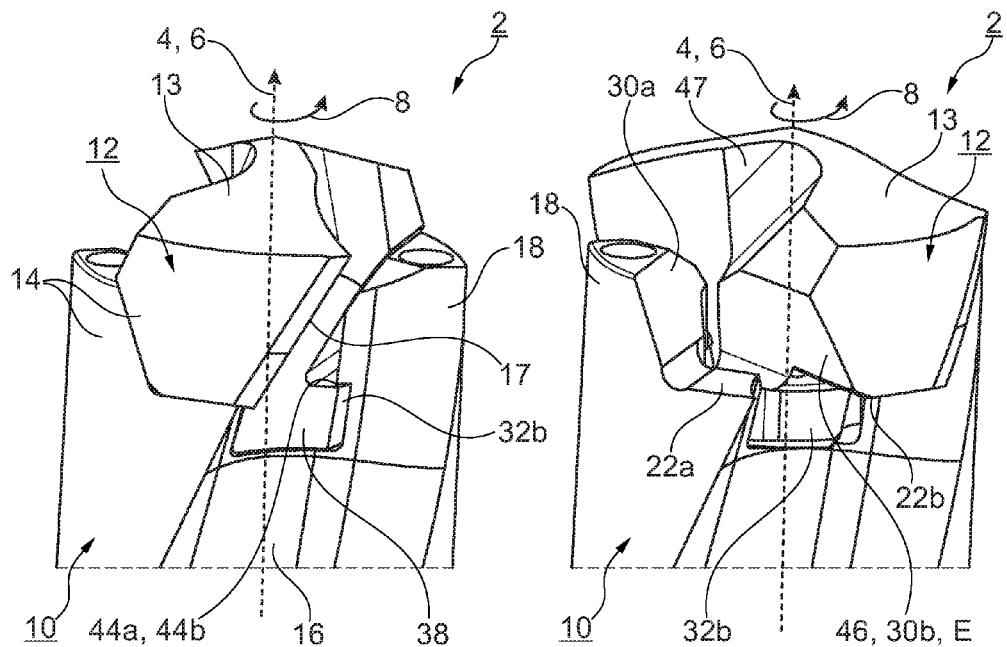
FIGS. 1A, 1B are lateral views in section of a modular rotary tool designed as a drill in accordance with a first variant with a cutting edge completely screwed into a carrier (FIG. 1A), and with an inserted cutting head which is still to be clamped into the carrier by turning (FIG. 1B)

The rotary tool 2 illustrated in the figures is designed as a modular drilling tool. It extends in an axial direction 4 along an axis of rotation 6. The rotary tool 2 rotates about the axis of rotation 6 during normal operation in the direction of rotation 8, which at the same time defines a circumferential direction.

The rotary tool 2 is composed of a carrier 10 and a cutting head 12 that can be interchangeably attached thereto. The cutting head 12 comprises major cutting edges (not described in more detail here) which are usually connected to one another in the center at a drill face via cross-cutting edges, and which extend radially outwardly. Counter to the direction of rotation 8, the major cutting edges are adjoined by major free spaces on the end surface which are part of a front end surface 13 of the cutting head 12. The end surface 13 is typically constituted by the major free spaces and the surface regions in the center of the cutting head, where the major cutting edges are generally connected to one another via cross-cutting edges. On its circumferential side, the cutting head 12 comprises a rear portion 14 which is interrupted by opposing flutes 16. The flutes preferably start at the cutting head 12 and transition into the carrier 10. In the present working embodiment, the flutes 16 extend approximately helically. The carrier 10 has a grooved shaft region at which minor cutting edges 17 typically continue, which minor cutting edges extend along the flutes 16 and start at the cutting head 12. The grooved shaft region of the carrier 10 is, in usual manner, additionally adjoined by a non-grooved clamping segment with which the rotary tool 2 is clamped in a machine tool.

In the following, corresponding elements on the carrier 10 are designated with the letter a and corresponding elements on the cutting head 12 are designated with the letter b.

The carrier 10 comprises on its end surface two approximately diagonally opposing fastening webs 18, which are interrupted by the flutes 16. In the present working embodiment, the fastening webs 18 are respectively designed to be approximately stepped, wherein the bottom step surface constitutes a front support surface 22a on which the cutting head 12 rests with a head support surface 22b. The front support surface 22a as well as the head support surface 22b are each respectively adjoined by a torque surface 30a,b, each of which respectively extends up to the outer circumference, i.e. up to the rear portion 14. An upper step surface of the fastening web 18 constitutes a free end surface of the carrier 10 which thus is not covered by the cutting head 12. In the present working embodiment, coolant channels exit at this free end surface.

The torque surface 30a is generally spanned by a transverse direction 34 and a longitudinal direction 36. The transverse direction 34 is oriented orthogonally to the axial direction 4 and, in the first example embodiment according to FIGS. 1A and 1B, the longitudinal direction 36 is oriented at an inclination angle α with respect to the longitudinal direction 36.

For the clamping attachment of the cutting head 12 in the carrier 10, the cutting head 12 has a clamping or coupling pin 38 that corresponds to the pin receptacle 20 and that, in the first example embodiment of FIGS. 1 to 4, adjoins the head support surfaces 22b downward in the axial direction. The coupling pin 38 respectively has on its shell side clamping segments 32b that are arranged oppositely in pairs and interact with corresponding clamping segments 32a of the pin receptacle 20. A press fit is respectively produced between these clamping segments 32a,b that are associated with one another.

In the first example embodiment, the coupling pin 38 is overall designed like a circular disk with circular segment-like recesses 40, as can be seen in particular in FIG. 3B. As can furthermore be seen in particular in FIGS. 3A to 3C, the coupling pin 38 is also adjoined in the axial direction by a lead-in or centering pin 42 which, however, does not produce any press fit with the carrier in the inserted condition.

In order to prevent a pulling-out in the axial direction, stop surfaces 44a,b that correspond to one another and that in particular constitute an upper boundary surface of the coupling pin 38 are formed on the pin receptacle 20 and on the coupling pin 38. In particular, they travel horizontally, i.e. orthogonal to the axial direction. As an alternative to a precise horizontal orientation, they can be slightly inclined, for example at an angle of up to 30°.

It is now of special note that the stop surfaces 44b of the coupling pin 38 are exposed in the manner of an uncovering. For this purpose, the stop surface 44b is adjoined—preferably by forming a curve—by a lateral surface 46 that is preferably designed (particularly) as a planar ground surface. This lateral surface 46 extends in the direction toward the end surface 13 and tapers off freely at its end. In a top view, as viewed in the axial direction (cf. for example FIG. 3C), the lateral surface 46 is therefore not covered by the end surface 13. In the first exemplary embodiment of FIGS. 1 to 4, the lateral surface 46 is also adjoined in the direction toward the end surface 13 by an additional ground surface that is oriented in the direction opposite the lateral surface 46. In the present example embodiment, a bend is formed between the two surfaces, which bend is approximately at the level of the free boundary surface of the fastening webs 18 on the end surface side. This additional ground surface extends up to the end surface 13.

In the region of the cross-cutting edge, what is known as a point thinning 47 is generally also provided; this is illustrated, for example, in FIG. 3A as a central surface region next to the flute 16 and above the torque surface 30b. This point thinning 47 is presently not associated with the end surface 13.

In the embodiment of FIGS. 1 to 4, the lateral surface 46 simultaneously also constitutes the torque surface 30b.

Figures 2A, 2B:
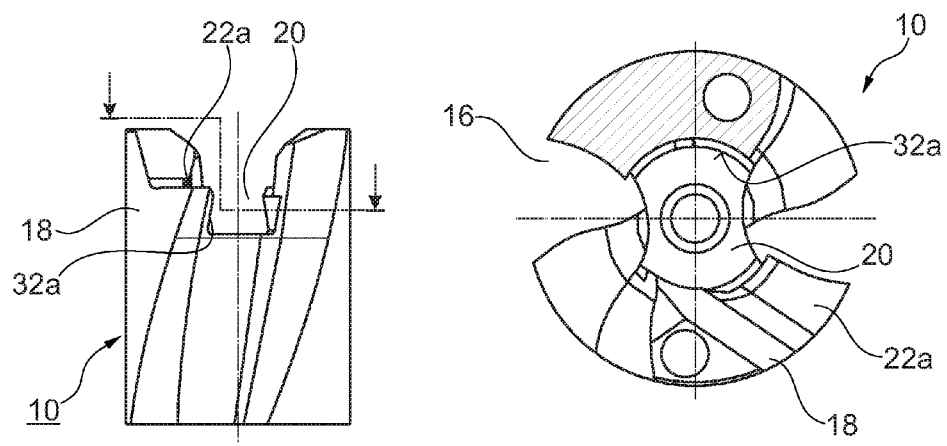
FIGS. 2A, 2B is a lateral view (FIG. 2A) of the carrier according to FIGS. 1A, 1B and a sectional view (FIG. 2B) along the section line II-II in FIG. 2A, FIGS. 3A, 3B, 3C are different views of the cutting head according to FIGS. 1A, 1B.

Corresponding to the stop surface 44b, the carrier 10 comprises a stop surface 44a on the carrier side, which stop surface is designed as a stepped overhang (cf. FIGS. 1A, 2A and 4). In an angular region covered by the front support surface 22a, the pin receptacle 20 in particular comprises inner shell regions that taper off upwardly without an overhang toward the front support surfaces 22a. In contrast thereto, the overhang with the stop surfaces 44a is formed in the angular region of the fastening webs 18 that adjoins the front support surfaces 22a. These also extend correspondingly to the stop surfaces 44b, and in particular in a direction orthogonal to the axial direction 4.

When viewed in a projection in the transverse direction 34, the lateral surfaces 46 being oriented at an inclination angle α results overall in a lateral view of the cutting head 12 as illustrated in FIG. 3C. Here, a trapezoidal rear surface 48 of the rear portion 14 can be well appreciated, wherein that surface tapers off in a direction toward the coupling pin 38.

As can be well appreciated from this lateral illustration, the longitudinal direction travels at least largely parallel to the minor cutting edge 17. The minor cutting edge is oriented at a flute angle relative to the axial direction 4, wherein that flute angle thus at least substantially corresponds to the inclination angle α.

Overall, the lateral surface 46 spans a plane E which is oriented such that it tapers off freely into an adjoining flute 16 on the one hand, and furthermore is oriented such that it does not touch or intersect the minor cutting edge 17 adjoining the respective flute 16. This ensures that the opposing minor cutting edge 17 is not damaged during grinding of the lateral surface 46.

As can already been seen in FIGS. 3A to 3C, each clamping segment 32b of the coupling pin 38 has several clamping surfaces (two in the present working embodiment), indicated at 50b, 52b; these clamping surfaces are separated in particular by a concavely curved transition region 53b, which is curved in the opposite direction of the clamping surfaces 50b, 52b. The clamping surfaces 50b, 52b are respectively partially cylindrical. Each clamping surface 50b, 52b is assigned to an opposite clamping surface 50b, 52b of the coupling pin 38 so that a clamping surface pair is respectively constituted. Of special note, each diameter d1, d2 of such a clamping surface pair is different. The clamping surfaces 50b, 52b themselves constitute partially cylindrical surfaces, thus lying on a circular arc. The diameter d1 is associated with the clamping surfaces 50b and the diameter d2 is associated with the clamping surfaces 52b. When screwing the cutting head 12 into the carrier 10, the cutting head is generally screwed in counter to the conventional drilling direction of the rotation indicated at 8. In doing so, the clamping surfaces 52b initially come to overlap the fastening webs 18, thus constituting leading clamping surfaces during screwing-in. These leading clamping surfaces 52b have a smaller diameter d2 than the trailing clamping surfaces 50b. The difference in diameter between successive clamping surfaces 50b, 52b is preferably in the range of 0.04 mm to 0.1 mm.

The pin receptacle 20 comprises corresponding partially cylindrical clamping surfaces 50a, 52a with a transition region 53a lying between them.

In connection with FIGS. 5 to 8, a second embodiment is explained in more detail, wherein mainly the differences relative to the first embodiment are described below. With regard to the same or comparable designs of the individual parts, reference is made to the description of the first example embodiment.

A first differentiating feature is apparent in that the coupling pin 38 is no longer designed as an in particular disk-shaped element attached downward in the axial direction, but rather constitutes a central segment 54. This means that the coupling pin 38 is generally adjoined in the radial direction by a surface. The surface adjoining in the radial direction in particular constitutes a part of the torque surface 30b. In this case, the coupling pin 38 also comprises an upper, (particularly, once again) at least substantially horizontal stop surface 44b. The latter is adjoined by the lateral surface 46, considered upwardly and in axial direction 4 toward the front side end surface 13. This lateral surface may be, but does not necessarily need to be, a part of the torque surface 30b. In the present example embodiment, the lateral surface 46 is also adjoined in the radial direction by an upper partial segment of the torque surface 30b.

Another difference relative to the first embodiment can be seen in that the lateral surface 46 extends parallel to the axial direction 4, i.e. its longitudinal direction 36 extends parallel to the axial direction 4. In this embodiment variant, there is basically the possibility of also designing the longitudinal direction 36 to be inclined in a similar manner as in the first embodiment variant. The bottom side of the coupling pin 38 presently lies in a common plane together with a support surface of the cutting head 12, with which it rests at the floor in the pin receptacle 20.

The torque surfaces 30a,b therefore extend in an axial direction over the entire axial length of the pin receptacle 20. Accordingly, the fastening webs 18 in the second embodiment are also not formed like steps. The torque surface 30a constitutes a continuous, flat surface. There is basically also the possibility that this can be designed to be diagonally inclined—similar to the lateral surface 46 described previously.

In order to form the stop surface 44a on the carrier, at the end of the fastening web 18 a radially inwardly oriented overhang is formed which thus covers to this extent a corresponding clamping segment 32a on the carrier 10.

Figure 6A:
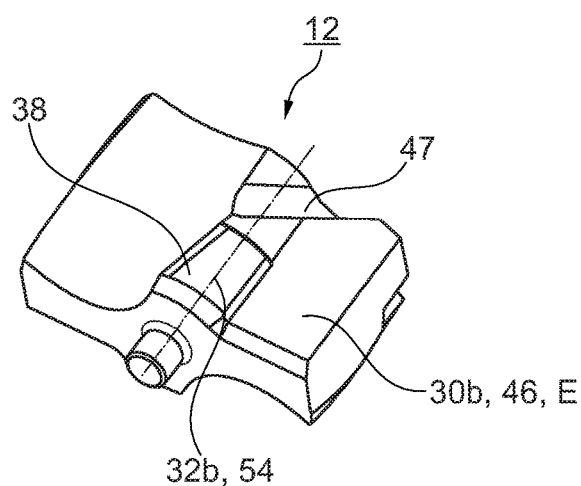
Figure 6B:
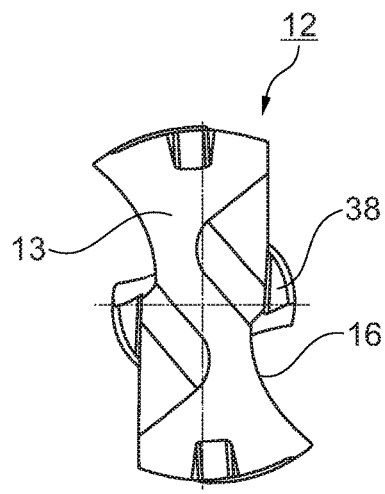
Figure 6C:
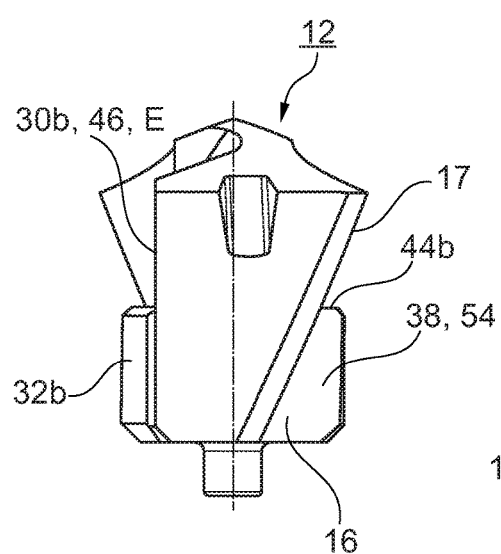
Figure 7:
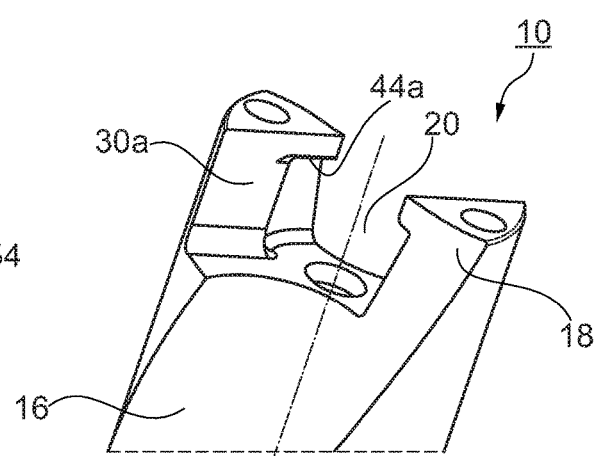
FIG. 7 is a perspective view of the carrier of the second embodiment.

As can be seen in particular in the top view according to FIG. 6C, in this embodiment, the stop surface 44b protrudes from the end surface 13, thus protruding beyond it in the radial direction.

What is claimed is:

1. A rotary tool which extends in an axial direction along an axis of rotation, the rotary drill comprising:
    a carrier;
    a cutting head which is interchangeably attached to the carrier and comprises a front end surface;
    the carrier comprising fastening webs which define a pin receptacle;
    the cutting head comprising a coupling pin which is insertable into the pin receptacle via rotating the cutting head relative to the carrier to thereby form, via a press fit, a clamping connection between the cutting head and the carrier;
    the coupling pin and the fastening webs each comprise clamping surfaces, wherein the clamping surfaces of the coupling pin and of the fastening webs interact with each other to radially center the coupling pin and to transmit a radial clamping force;
    the pin receptacle and the coupling pin each comprising stop surfaces, wherein the stop surfaces of the pin receptacle and of the coupling pin interact with each other for axial pull-out prevention;
    wherein the cutting head includes lateral surfaces disposed adjacent to the stop surfaces of the coupling pin;
    each of the lateral surfaces extending, generally axially, to a front end portion thereof and toward the front end surface of the cutting head;
    wherein, when viewed with respect to the axial direction, the front end surface of the cutting head does not overlap the front end portion of each of the lateral surfaces;
    wherein the stop surfaces of the coupling pin are disposed axially closer to the front end surface of the cutting head than are the clamping surfaces of the coupling pin; and
    wherein the stop surfaces form axially upper boundary surfaces of at least a portion of the coupling pin, in a direction defined axially toward the front end of the cutting head.

2. The rotary tool according to claim 1 wherein:
    each of the lateral surfaces terminates at the front end portion thereof;
    wherein, when viewed with respect to the axial direction, the front end portion of each of the lateral surfaces is not covered by any other part of the cutting head.

3. The rotary tool according to claim 1, wherein the rotary tool comprises a drill.

4. The rotary tool according to claim 1, wherein:
    the cutting head and the carrier each comprise torque surfaces; and
    the torque surfaces of the cutting head and of the carrier interact with each other to transmit a torque between the carrier and the cutting head.

5. The rotary tool according to claim 4, wherein each of the lateral surfaces comprises one of the torque surfaces of the cutting head, and extends to an outermost circumference of the cutting head.

6. The rotary tool according to claim 4, wherein each of the torque surfaces of the cutting head:
    is disposed adjacent to a corresponding one of the stop surfaces of the cutting head; and
    extends to an outermost circumference of the cutting head.

7. The rotary tool according to claim 4, wherein the clamping surfaces of the coupling pin and of the fastening webs extend in parallel to the axial direction.

8. The rotary tool according to claim 4, wherein:
the coupling pin comprises a central portion of the cutting head;
wherein the central portion is disposed, with respect to a radial direction, adjacent to the torque surfaces.

9. The rotary tool according to claim 1, wherein each of the lateral surfaces is formed as a flat, ground surface.

10. The rotary tool according to claim 1, wherein:
each of the lateral surfaces extends over a transverse direction and over a longitudinal direction;
wherein the transverse direction is orthogonal to the axial direction, and the longitudinal direction is inclined at a non-zero inclination angle with respect to the axial direction.

11. The rotary tool according to claim 10, wherein the inclination angle is in the range between 10 degrees and 25 degrees.

12. The rotary tool according to claim 10, wherein:
the cutting head comprises a rear surface which, when viewed in a two-dimensional projection, has a generally trapezoidal shape;
the rear surface being disposed, at an axially lower end thereof, adjacent to the coupling pin;
wherein, with respect to a radial direction, the coupling pin protrudes beyond the rear surface.

13. The rotary tool according to claim 10, wherein:
the cutting head comprises flutes;
each of the lateral surfaces extends to at least one of the flutes; and
each of the flutes extends to a circumferential minor cutting edge opposite one of the lateral surfaces;
wherein each of the circumferential minor cutting edges lies behind a plane which is spanned by a corresponding one of the lateral surfaces, such that the plane does not touch the cutting head in a region of the minor cutting edge.

14. The rotary tool according to claim 13, wherein:
each of the minor circumferential cutting edges is inclined at a flute angle with respect to the axial direction; and
the inclination angle substantially corresponds to the flute angle, such that each of the minor circumferential cutting edges extends parallel to the longitudinal direction.

15. The rotary tool according to claim 13, wherein:
each of the minor circumferential cutting edges is inclined at a flute angle with respect to the axial direction; and
the inclination angle is approximately 5 to 15 degrees smaller than the flute angle.

16. The rotary tool according to claim 1 wherein, when viewed with respect to the axial direction, each of the stop surfaces of the cutting head does not protrude beyond the front end surface of the cutting head.

17. The rotary tool according to claim 1 wherein, when viewed with respect to the axial direction, each of the stop surfaces of the cutting head protrudes beyond the front end surface of the cutting head.

18. The rotary tool according to claim 1, wherein:
the cutting head comprises flutes; and
the coupling pin is defined by a circular disk shape interrupted by opposing recesses for the flutes.

19. The rotary tool according to claim 1, wherein:
the cutting head comprises flutes; and
the lateral surfaces are separate components with respect to the flutes.

20. A cutting head for a rotary tool, wherein the cutting head extends in an axial direction along an axis of rotation, the cutting head comprising:
a front end surface; and
a coupling pin for being fastened in a pin receptacle of a carrier;
the coupling pin comprising:
clamping surfaces for radially centering the coupling pin and for transmitting a radial clamping force; and
stop surfaces for axial pull-out prevention; and
the cutting head further comprising lateral surfaces disposed adjacent to the stop surfaces;
wherein each of the lateral surfaces extends, with respect to the axial direction, to a front end portion of the lateral surface and toward the front end surface of the cutting head;
wherein, when viewed with respect to the axial direction, the front end surface of the cutting head does not overlap the front end portion of each of the lateral surfaces;
wherein the stop surfaces of the coupling pin are disposed axially closer to the front end surface of the cutting head than are the clamping surfaces of the coupling pin; and
wherein the stop surfaces form axially upper boundary surfaces of at least a portion of the coupling pin, in a direction defined axially toward the front end of the cutting head.

21. The cutting head according to claim 20, wherein:
the clamping surfaces comprise pairs of clamping surfaces which oppose one another on the coupling pin;
wherein each of the clamping surfaces extends along a circular arc when viewed in cross section orthogonally to the axial direction;
wherein each of the pairs of clamping surfaces defines a diameter; and
with respect to a predefined direction of rotation of the cutting head, the diameter increases from one pair of clamping surfaces to another, succeeding pair of clamping surfaces.

22. The cutting head according to claim 20, wherein at least a portion of each of the lateral surfaces is disposed radially inwardly with respect to at least a portion of a corresponding one of the stop surfaces.

23. The cutting head according to claim 22, wherein at least a portion of each of the lateral surfaces is disposed radially outwardly with respect to all portions of a corresponding one of the stop surfaces.

24. A rotary tool which extends in an axial direction along an axis of rotation, the rotary drill comprising:
a carrier;
a cutting head which is interchangeably attached to the carrier and comprises a front end surface;
the carrier comprising fastening webs which define a pin receptacle;
the cutting head comprising a coupling pin which is insertable into the pin receptacle via rotating the cutting head relative to the carrier to thereby form, via a press fit, a clamping connection between the cutting head and the carrier;
the coupling pin and the fastening webs each comprise clamping surfaces, wherein the clamping surfaces of the coupling pin and of the fastening webs interact with each other to radially center the coupling pin and to transmit a radial clamping force;
the pin receptacle and the coupling pin each comprising stop surfaces, wherein the stop surfaces of the pin receptacle and of the coupling pin interact with each other for axial pull-out prevention;

wherein the cutting head includes lateral surfaces disposed adjacent to the stop surfaces of the coupling pin;

each of the lateral surfaces extending, generally axially, to a front end portion thereof and toward the front end surface of the cutting head;

wherein, when viewed with respect to the axial direction, the front end surface of the cutting head does not overlap the front end portion of each of the lateral surfaces; and wherein the stop surfaces of the coupling pin are disposed axially closer to the front end surface of the cutting head than are the clamping surfaces of the coupling pin;

each of the lateral surfaces extending over a transverse direction and over a longitudinal direction;

wherein the transverse direction is orthogonal to the axial direction, and the longitudinal direction is inclined at a non-zero inclination angle with respect to the axial direction;

the cutting head comprising flutes;

each of the lateral surfaces extending to at least one of the flutes; and each of the flutes extending to a circumferential minor cutting edge opposite one of the lateral surfaces;

wherein each of the circumferential minor cutting edges lies behind a plane which is spanned by a corresponding one of the lateral surfaces, such that the plane does not touch the cutting head in a region of the minor cutting edge.

* * * * *